United States Patent [19]
Stoen et al.

[11] Patent Number: 6,142,422
[45] Date of Patent: *Nov. 7, 2000

[54] METHOD TO REORIENT A SPACECRAFT USING ONLY INITIAL SINGLE AXIS ATTITUDE KNOWLEDGE

[75] Inventors: Jeffery D Stoen, Palo Alto; Kam Chan, San Jose, both of Calif.

[73] Assignee: Space Systems/Loral, Inc., Palo Alto, Calif.

[*] Notice: This patent is subject to a terminal disclaimer.

[21] Appl. No.: 09/337,078

[22] Filed: Jun. 21, 1999

Related U.S. Application Data

[63] Continuation of application No. 08/934,981, Sep. 22, 1997.
[60] Provisional application No. 60/028,161, Oct. 16, 1996.

[51] Int. Cl.[7] .................................................. B64G 1/26
[52] U.S. Cl. ........................ 244/164; 244/169; 244/171
[58] Field of Search .................................. 244/171, 164, 244/169

[56] References Cited

U.S. PATENT DOCUMENTS

| | | | |
|---|---|---|---|
| 4,084,772 | 4/1978 | Muhlfelder | 244/165 |
| 4,489,383 | 12/1984 | Schmidt, Jr. | 364/434 |
| 4,521,855 | 6/1985 | Lehner et al. | 364/434 |
| 4,599,697 | 7/1986 | Chan et al. | 364/434 |
| 4,684,084 | 8/1987 | Fuldner et al. | 244/168 |
| 4,725,024 | 2/1988 | Vorlicek | 244/164 |
| 4,758,957 | 7/1988 | Hubert et al. | 364/434 |
| 4,759,517 | 7/1988 | Clark | 244/168 |
| 4,767,084 | 8/1988 | Chan et al. | 244/164 |
| 4,848,706 | 7/1989 | Garg et al. | 244/169 |
| 4,931,942 | 6/1990 | Garg et al. | 364/459 |
| 5,058,835 | 10/1991 | Goodzeit et al. . | |
| 5,109,346 | 4/1992 | Wertz | 364/459 |
| 5,140,525 | 8/1992 | Shankar et al. . | |
| 5,184,790 | 2/1993 | Fowell | 244/165 |
| 5,222,023 | 6/1993 | Liu et al. | 364/434 |
| 5,349,532 | 9/1994 | Tilley et al. | 364/459 |
| 5,400,252 | 3/1995 | Kazimi et al. | 364/434 |
| 5,452,869 | 9/1995 | Basuthakur et al. | 244/164 |
| 5,459,669 | 10/1995 | Adsit et al. | 364/459 |
| 5,473,746 | 12/1995 | Pritt et al. . | |
| 5,508,932 | 4/1996 | Achkar et al. . | |
| 5,608,634 | 3/1997 | Goodzeit et al. . | |

FOREIGN PATENT DOCUMENTS 0 499 815 A1  8/1992  European Pat. Off. .

OTHER PUBLICATIONS

"Quarternion Feedback for Spacecraft Large Angle Manuevers", Bong Wie et al., J. Guidance, vol. 8 No. 3, May, Jun. 1985, pp. 360–365.

"Attitude Stabilization of Flexible Spacecraft During Stationkeeping Manuevers", Bong Wie et al., J. Guidance, vol. 7, No. 4, pp. 430–436, Jul.–Aug. 1984.

*Primary Examiner*—Peter M. Poon
*Assistant Examiner*—Tien Dinh
*Attorney, Agent, or Firm*—Perman & Green, LLP

[57] ABSTRACT

A method for inertially aligning a spacecraft along an axis, comprising the steps of using quaternion feedback control to reorient the spacecraft, and during the step of reorienting, using rate integrating gyroscopes in a pulse rebalance loop. The method operates to orient the spacecraft along an inertial direction of interest by the steps of operating a sensor to provide an initial fix on the inertial direction of interest; repetitively determining a difference between a commanded quaternion and a quaternion estimated based on sensed angular rates; and selectively applying torques to the spacecraft so as to drive the difference towards zero such that a spacecraft vector is aligned with the inertia direction of interest, thereby orienting the spacecraft. One mode of operation maintains the spacecraft fixed in orientation, while another mode of operation rotates the spacecraft about the direction of interest by using a bias-rate blind quaternion propagation technique.

15 Claims, 16 Drawing Sheets

ACTUAL RATES

DIRA MEASURED RATES

ACTUAL QUATERNIONS

ESTIMATED QUATERNIONS

THRUSTER TORQUES AND FUEL USE

QUATERNION ERRORS

SUNLINE VECTOR
IN AND OUT-OF-PLANE

CONTROL PARAMETERS

T & C SIGNAL STRENGTH AND RELATED QUANTITIES

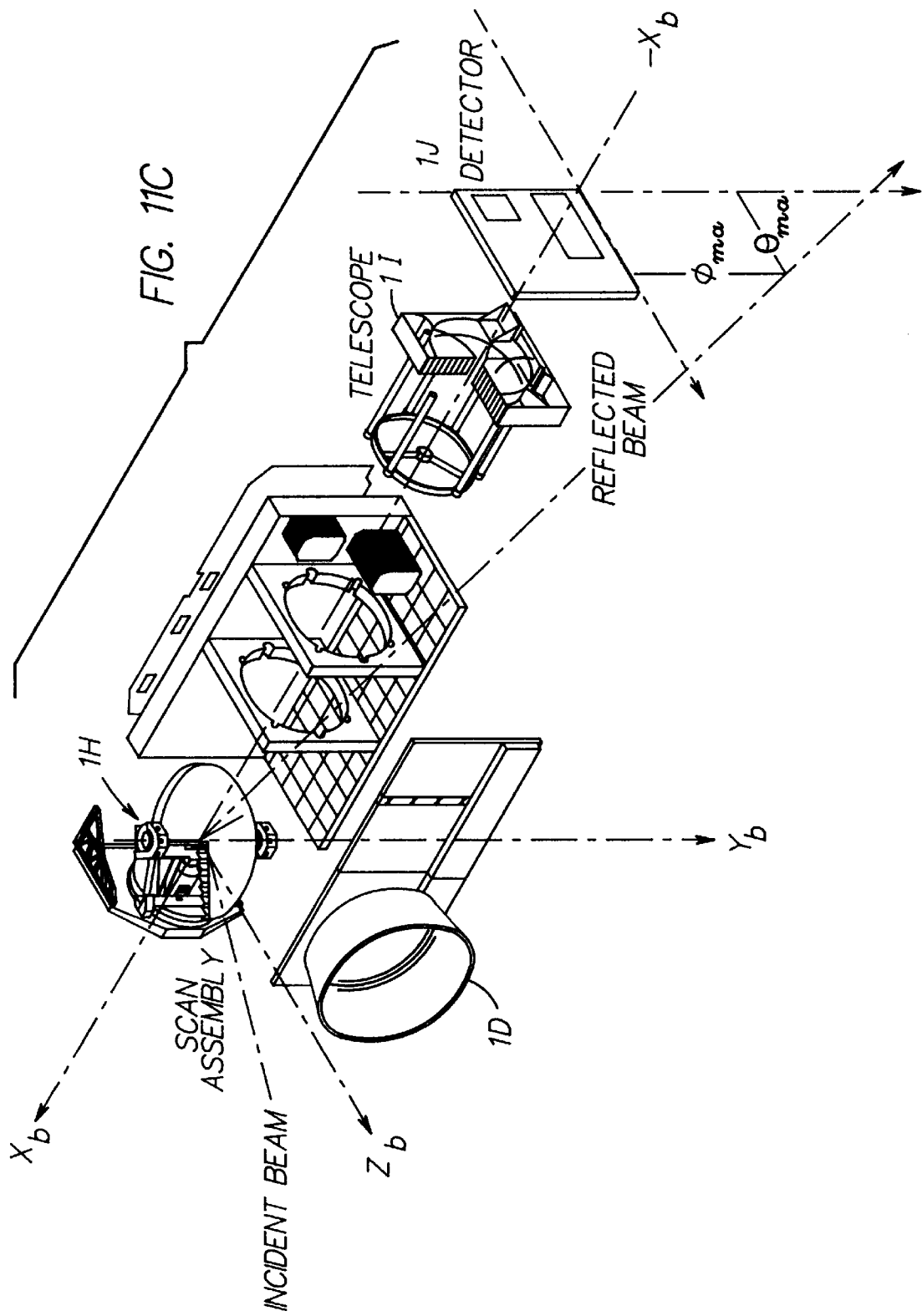

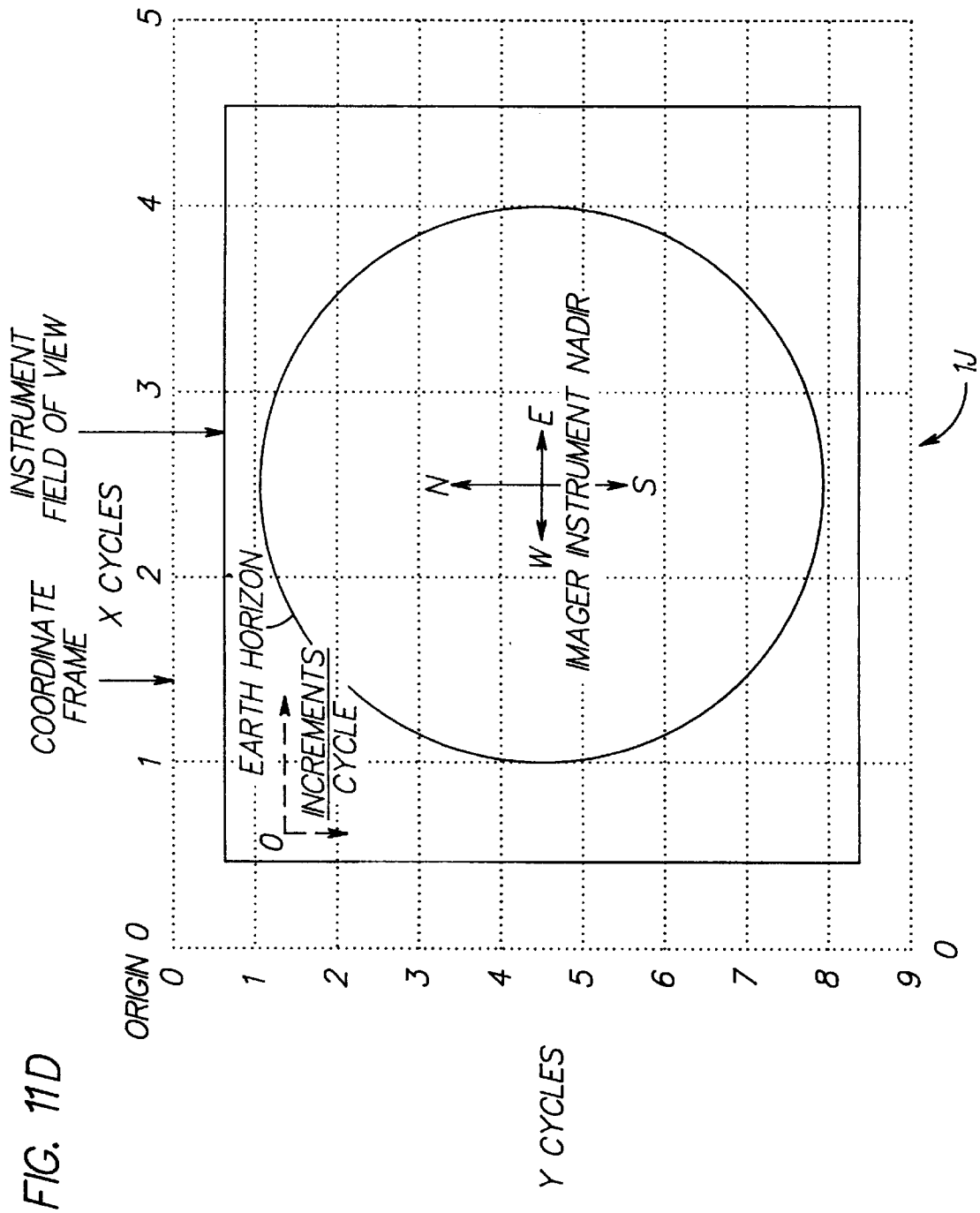

METHOD TO REORIENT A SPACECRAFT USING ONLY INITIAL SINGLE AXIS ATTITUDE KNOWLEDGE

This appln is a con of Ser. No. 08/934,981 Sep. 22, 1997.

CLAIM OF PRIORITY FROM A COPENDING PROVISIONAL PATENT APPLICATION

Priority is herewith claimed under 35 U.S.C. §119(e) from copending Provisional Patent Application Ser. No. 60/028,161, filed Oct. 16, 1996, entitled "Method to Reorient a Spacecraft Using Only Initial Single Axis Attitude Knowledge", by J. D. Stoen and K. Chan. The disclosure of this Provisional Patent Application is incorporated by reference herein in its entirety.

FIELD OF THE INVENTION

This invention relates generally to spacecraft and, in particular, to methods and apparatus for orienting a spacecraft to a desired orbital configuration.

BACKGROUND OF THE INVENTION

Spacecraft perform various maneuvers after they are launched into space and once they are on-station in an intended orbit. After the spacecraft is on-station in a selected orbit, various forces (e.g., solar and/or other environmental disturbance torques, such as magnetic torques) may act on the spacecraft and cause the spacecraft to drift away from its selected orbit into another, incorrect orbit. Thus, periodic (e.g., daily, weekly, or monthly) orbital maneuvers are often required to return the spacecraft to the correct orbit. These types of maneuvers are known as station-keeping maneuvers.

It is also required to correctly orient a spacecraft having solar panels with the sun, in order to maximize the generation of electrical power.

During the performance of such maneuvers the precise control of the spacecraft's attitude to orient the spacecraft's payload, such as communication or imaging hardware, to a preselected planetary location and/or to correctly orient the spacecraft's thrust vector is also important. Thus, spacecraft are typically equipped with closed-loop control systems which enable the attitude of the spacecraft to be controlled within pre-established deadband limits. Such control systems often employ spacecraft thrusters for selectively producing torques on the spacecraft for correcting and maintaining the spacecraft attitude.

The following commonly assigned U.S. Patents are illustrative of various approaches to providing spacecraft attitude control: U.S. Pat. No. 5,459,669, Control System And Method For Spacecraft Attitude Control, to Adsit et al.; U.S. Pat. No. 5,400,252, Spacecraft East/West Orbit Control During A North Or South Stationkeeping Maneuver, to Kazimi et al.; U.S. Pat. No. 5,349,532, Spacecraft Attitude Control And Momentum Unloading Using Gimballed And Throttled Thrusters, to Tilley et al.; and U.S. Pat. No. 5,222,023, Compensated Transition For Spacecraft Attitude Control, to Liu et al.

Reference can also be had to U.S. Pat. No. 5,184,790, Two-Axis Attitude Correction For Orbit Inclination, to Fowell; U.S. Pat. No. 4,931,942, Transition Control System For Spacecraft Attitude Control, to Garg et al.; U.S. Pat. No. 4,848,706, Spacecraft Attitude Control Using Coupled Thrusters, Garg et al.; U.S. Pat. No. 4,767,084, Autonomous Stationkeeping For Three-Axis Stabilized Spacecraft, to Chan et al.; U.S. Pat. No. 4,599,697, Digital PWPF Three Axis Spacecraft Attitude Control, to Chan et al.; U.S. Pat. No. 4,521,855, Electronic On-Orbit Roll/Yaw Satellite Control, to Lehner et al.; U.S. Pat. No. 4,489,383, Closed-Loop Magnetic Roll/Yaw Control System For High Inclination Orbit Satellites, to Schmidt, Jr.; and U.S. Pat. No. 4,084,772, Roll/Yaw Body Steering For Momentum Biased Spacecraft, to Muhlfelder. Also of interest is U.S. Pat. No. 4,759,517, Station-Keeping Using Solar Sailing, to Clark; and U.S. Pat. No. 4,684,084, Spacecraft Structure with Symmetrical Mass Center and Asymmetrical Deployable Appendages, to Fuldner et al.

Reference is also made to a publication entitled "Attitude Stabilization of Flexible Spacecraft During Stationkeeping Maneuvers", Bong Wie et al., J. Guidance, Vol. 7, No. 4, pgs. 430–436, July–August 1984.

The use of quaternion feedback for large angle reorientation maneuvers using reaction jets is discussed in a publication entitled "Quaternion Feedback for Spacecraft Large Angle Maneuvers", J. Guidance, Vol. 8, No. 3, May, June 1985, pgs. 360–365.

It can be appreciated that a technique to reorient and hold, or to reorient and rotate, a spacecraft along a user specified axis in order to meet power, thermal, telemetry and control mission constraints is an important aspect of spacecraft operation.

OBJECTS AND ADVANTAGES OF THE INVENTION

It is a first object and advantage of this invention to provide an improved method and apparatus to reorient and hold, or to reorient and rotate, a spacecraft along a user specified axis, such as a body-fixed axis, in order to meet power, thermal, telemetry and control mission constraints.

It is a further object and advantage of this invention to provide a method and apparatus to reorient and hold, or to reorient and rotate, a spacecraft along a user specified axis, such as a body-fixed axis, by using only an initial single inertial reference.

SUMMARY OF THE INVENTION

The foregoing objects of the invention are realized by a spacecraft that is constructed and operated in accordance with the teachings of this invention.

In accordance with the teachings of this invention, complete a priori knowledge of a spacecraft's inertial attitude is not required in order reorient and hold or rotate the spacecraft. The method and apparatus in accordance with this invention may be used to reorient and rotate a spacecraft to meet mission requirements, with knowledge of only a single vector (2-axis) attitude of the spacecraft at the beginning of the maneuver. For the rotation case, a "rate-bias blind" quaternion propagation technique maintains the rotation axis inertially fixed by nulling any cross-axis angles and rates.

The use of this invention beneficially reduces the total number and complexity of spacecraft inertial sensors. Using knowledge of an initial single vector attitude, and in accordance with this invention, it is possible to adjust the spacecraft attitude to balance thermal and power constraints, to provide a method to direct power to a solar array without a sun sensor being located on that face of the spacecraft, and to provide a technique to rotate the spacecraft for, by example, evaluating and mapping a telemetry and command (T&C) signal strength.

This invention provides for making an accurate inertial alignment of an arbitrary axis (or, equivalently, an arbitrary line fixed in a body) without requiring inertial sensing capabilities along that axis. The method of this invention thus accommodates numerous situations wherein an inertial alignment of a spacecraft may be required to satisfy, for instance, a combination of thermal, power and/or telemetry and control constraints. For example, slewing a spacecraft to align fixed or stowed solar panels toward the sun to satisfy power requirements can be accommodated, with no inertial measurements being required other than an initial fix on the sun vector at the start of the slew. In addition to the reorientation capabilities just mentioned, the method of this invention also allows for rotation about an arbitrary body-fixed axis while accurately holding that axis inertially fixed by selectively nulling only the cross-axis angles and rates, using what is referred to herein as "rate-bias blind" quaternion propagation.

For example, the method of this invention can maintain a constant rotation rate about any axis fixed in the spacecraft body to allow for mapping a spacecraft's telemetry and command signal strength as a function of the rotation angle about the axis of rotation.

A method in accordance with this invention operates to orient the spacecraft along an inertial direction of interest by the steps of operating a sensor to provide an initial fix on the inertial direction of interest; repetitively determining a difference between a commanded quaternion and a quaternion estimate based, by example, on sensed angular rates; and selectively applying torques to the spacecraft so as to drive the difference towards zero such that a spacecraft vector is aligned with the inertia direction of interest, thereby orienting the spacecraft. One mode of operation maintains the spacecraft fixed in orientation, while another mode of operation rotates the spacecraft about the direction of interest by using a bias-rate blind quaternion propagation technique that biases the sensed angular rates in accordance with the predetermined angular rate.

BRIEF DESCRIPTION OF THE DRAWINGS

The above set forth and other features of the invention are made more apparent in the ensuing Description of the Invention when read in conjunction with the attached Drawing, wherein:

FIG. 11C is an elevational, exploded view of the imager payload that includes the imager scan assembly of FIG. 11B, and which further shows spacecraft and imager axes; and FIG. 11D illustrates the imager coordinate frame of the imager shown in FIG. 11C.

DETAILED DESCRIPTION OF THE INVENTION

Figure 1A:
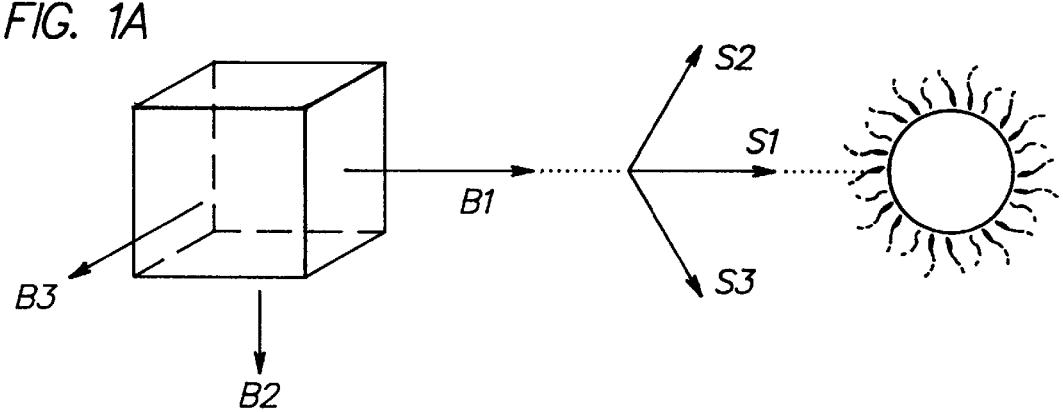
FIGS. 1A and 1B illustrate various reference frames that are useful in understanding the invention.
Figure 1B:
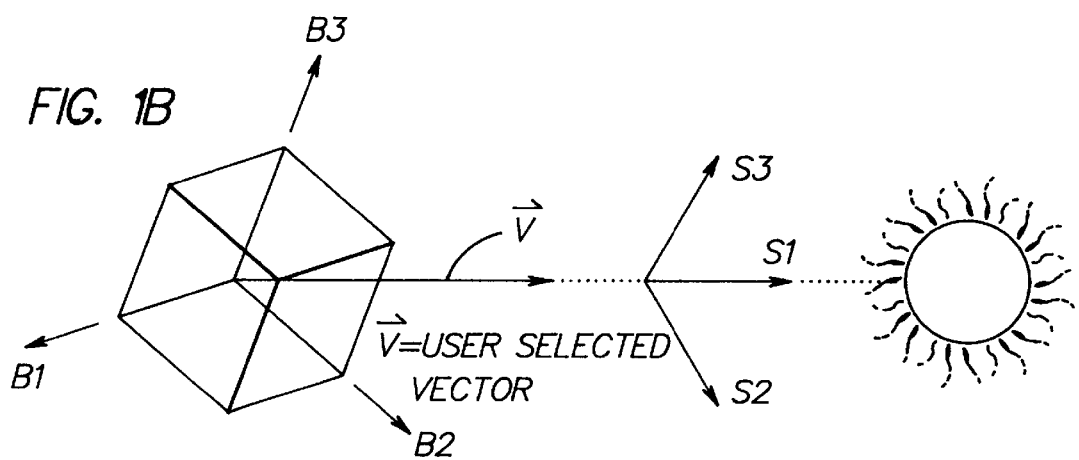

Reference is first made to FIGS. 1A and 1B, which show two reference frames described by a dextral set of mutually perpendicular unit vectors Si and Bi (i=1,2,3). Reference frame Si may be thought of as inertially fixed with S1 directed along the sensed inertial direction (i.e., if the sensor is a sun sensor, S1 is along the sun line), S2 is directed arbitrarily but is orthogonal to S1, and S3=S1×S2. Unit vector B1 is fixed in the spacecraft with B1 along the axis for which inertial sensing is available for initial alignment of B1 with an inertial direction, unit vector B2 is directed arbitrarily but orthogonal to B1, and unit vector B3=B1×B2.

The reorientation method is initiated with the spacecraft axes Bi aligned as shown in FIG. 1A, and with B1 coincident with S1. The inertial alignment of B1 is accomplished using some form of sensor, such as a sun, Earth, or star sensor. It should be noted that the method requires only an initial (i.e., at time 0) inertial sensing for B1. The orientation of B2 and B3 with respect to S2 and S3 is assumed to be unknown.

The method in accordance with this invention preferably uses quaternion feedback control to reorient the spacecraft. The only sensors used by the controller, other than the sensor needed to provide an initial fix on the inertial direction of interest, are preferably digital rate integrating gyros (DIRAs) that provide incremental angular rate changes to a quaternion integration algorithm.

Spacecraft control torques are provided, in a presently preferred but not limiting embodiment, by pulse-width pulse-frequency (PWPF) modulated reaction jets. Throughout the reorientation maneuver the difference between a commanded quaternion and the quaternion estimated by the quaternion controller is asymptotically driven to zero.

As a result of the reorientation the maneuver ends with the unit vector S1 aligned with any user selected vector fixed in the body of the spacecraft. As was the case initially, the orientation of B2 and B3 with respect to S2 and S3 remains unknown. The body may be held fixed in orientation, subject to what are typically small errors due to drift in the DIRAs and inaccuracies in the quaternion propagation.

Further in accordance with this invention, the spacecraft may also be made to rotate at a constant rate about S1, or any user selected body-fixed axis. This is accomplished by using a bias-rate blind quaternion propagation technique in accordance with this invention. To rotate the spacecraft body, the user simply specifies the vector components, in the Bi (i=1,2,3) frame, of the rotation vector N. That is, the user specifies the measure numbers n1, n2, and n3 in the equation:

$$N=n1B1+n2B2+n3B3,$$

and the desired rate of rotation about vector N.

Y–Z Sun Acquisition Mode

The utility of the invention will now be illustrated in the context of a Y–Z Sun Acquisition mode of operation. The Y–Z Sun Acquisition mode is initiated following a completion of a nominal X-axis sun acquisition as depicted at point A in FIG. 2. The nominal sun acquisition procedure hands over control to the Y–Z Sun Acquisition procedure with a spacecraft 1 configured such that the vector from the spacecraft 1 to the sun, hereafter referred to as the sunline, is aligned with the spacecraft +X axis, and with the spacecraft 1 rotating about the sunline at an angular rate of, by example, 0.75 deg/sec. Other initial vectors could be employed in other embodiments of this invention, such as a vector to a particular star or one to the Earth, with corresponding changes being made to the applicable sensor. Upon commanding the Y–Z Sun Acquisition procedure, logic accompanying a quaternion controller aboard the spacecraft 1 sends a sequence of commands which first null the rotation rate about the sunline, then reorient the spacecraft 1 from a +X sun pointing attitude to a "good sun" attitude for powering solar arrays. In this example the "good sun" attitude is considered to be one that is 35° off the +Y axis in the Y-Z plane (Point B).

Further by example, and after reorientation at Point B, a telemetry and command (T&C) signal strength can be initiated by commanding a rotation rate of, by example, 0.25 deg/sec about the sunline. The signal strength during one full rotation is monitored and mapped as a function of rotation angle about the sunline. Once the mapping is complete, the quaternion controller aboard the spacecraft 1 is used to reorient the spacecraft 1 to a final attitude, by example, one with the sunline 35° off the +Y axis and rotated about the sunline to the angle where the best signal strength was recorded in the above-mentioned T&C signal strength search.

The Y-Z Sun Acquisition reorientation can be completed from any +X-axis sun pointing initial attitude within, by example, 10 minutes. The reorientation maneuver places the sunline 35° off the +Y-axis towards the +Z-axis in the Y-Z plane. At the completion of the reorientation, the spacecraft 1 automatically rotates about its sunline axis at 0.25°/s. Through ground command, various biases (e.g., ±0.5°/s, ±0.25°/s and 0.0°/s) may be selected. Upon commanding the attitude hold mode, a pointing error is maintained to within ±2° deadband. Absolute average inertial pointing error is preferably less than ±5° within a 12 hour period while in the attitude hold mode. A capability to reorient the spacecraft 1 to a ground commanded target attitude is also provided.

Figure 2:
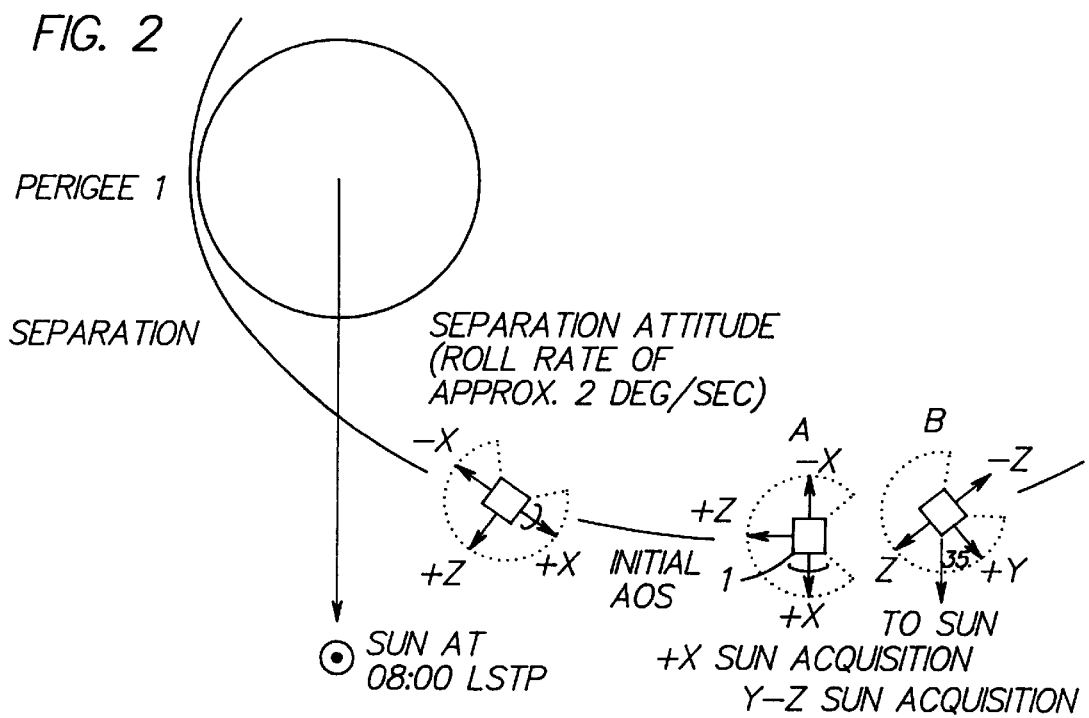
FIG. 2 depicts a transfer orbit/separation sequence that is useful in understanding this invention.

In FIG. 2 +Y is the pitch axis, +X is the roll axis, and +Z is the yaw axis.

Figure 11A:
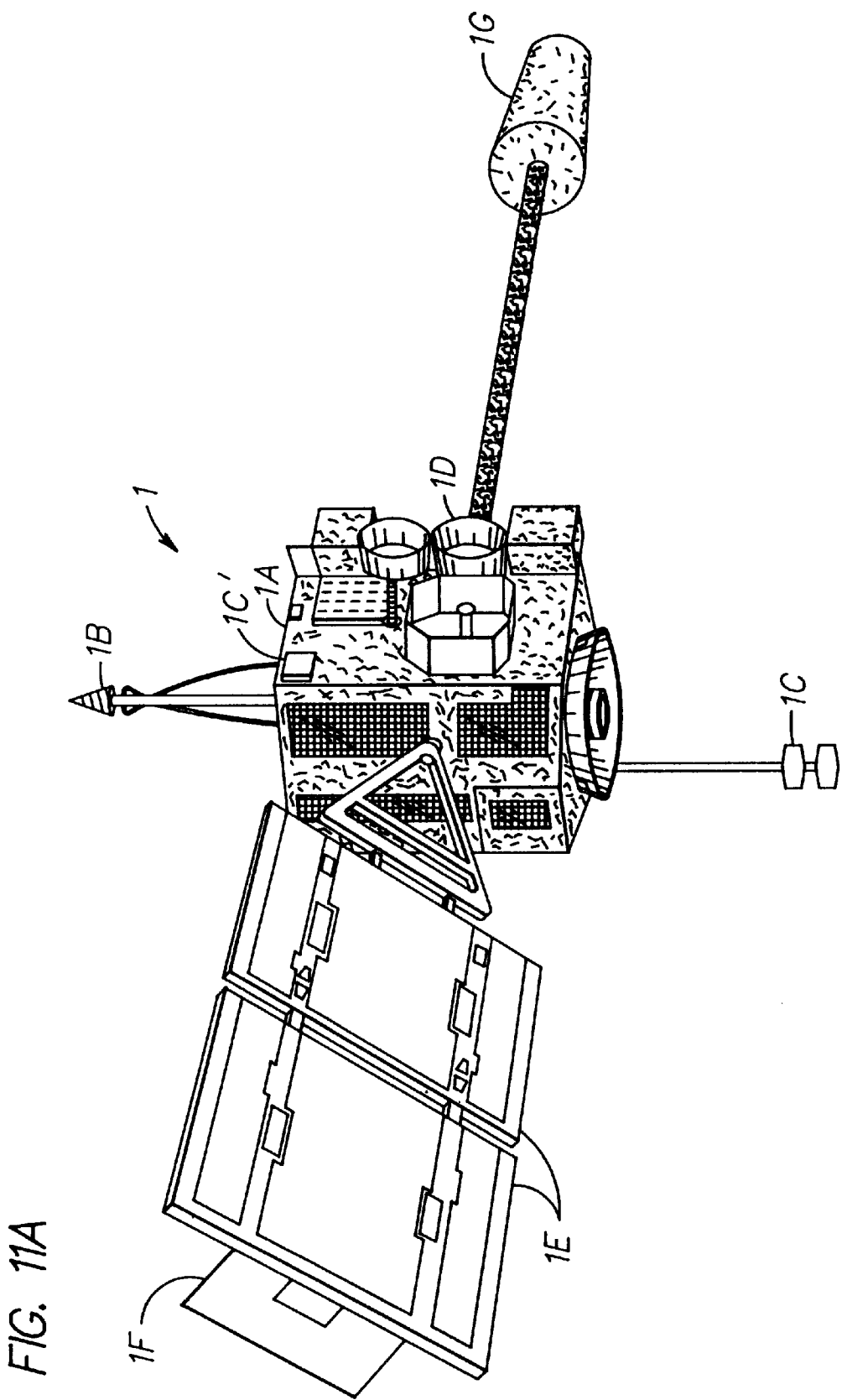
FIG. 11A is an elevational view of a spacecraft that is suitable for practicing this invention.
Figure 11B:
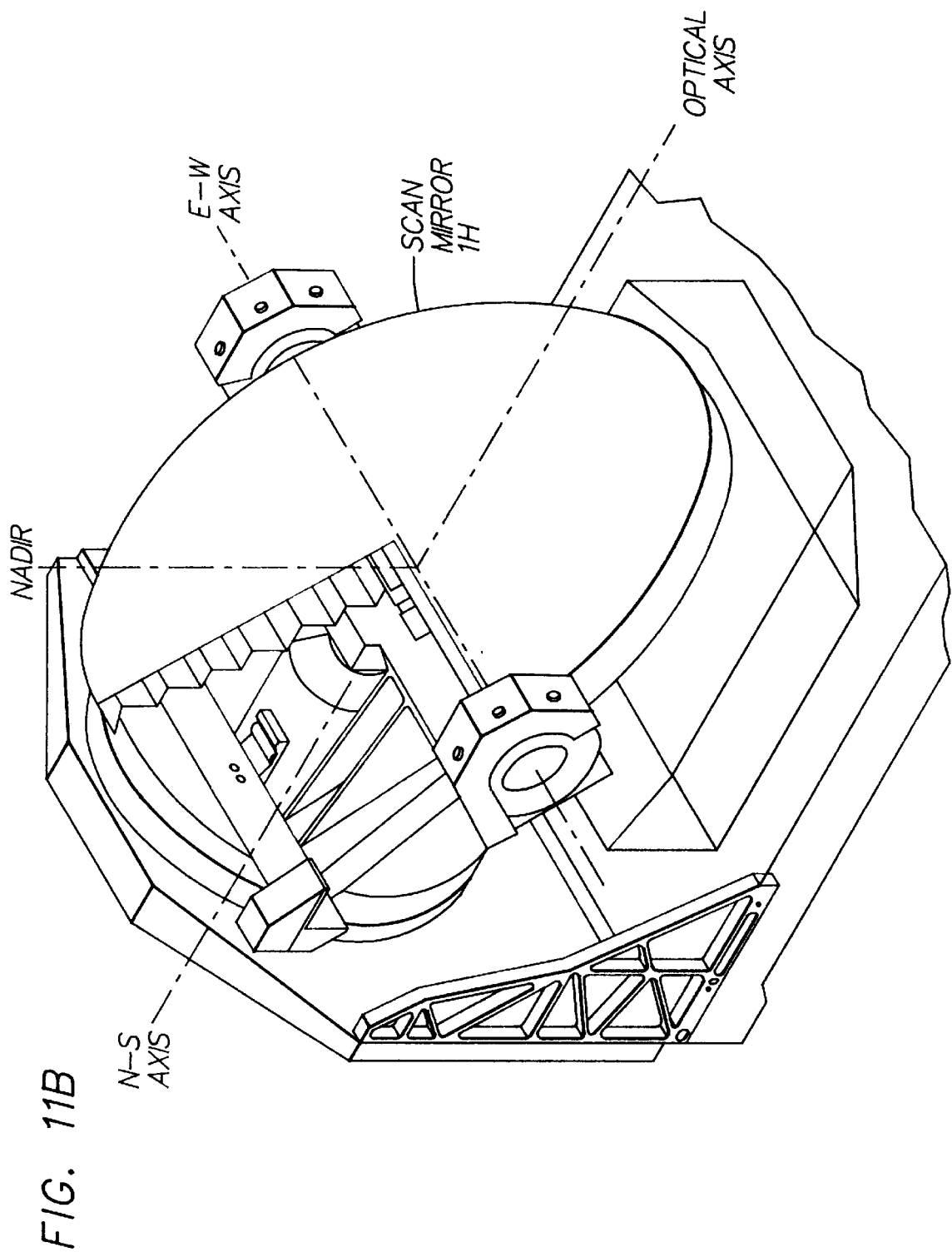
FIG. 11B is an elevational view of an imager scan assembly that forms a portion of the payload of the spacecraft of FIG. 11A.

Reference is made to FIGS. 11A–11D for showing an exemplary embodiment of the spacecraft 1 in greater detail. The spacecraft 1 includes a bus 1A from which protrudes a telemetry and control (T&C) antenna 1B, a magnetometer 1C, earth sensor 1C', and an entrance aperture 1D of the imaging payload. Also attached to the bus 1A are solar panels 1E which support a trim tab 10F, and a solar sail 1G. FIG. 11B shows a portion of the imaging payload, in particular a scan mirror 1H and its associated components. FIG. 11C illustrates the orientation of the scan mirror assembly and scan mirror 1H to the optical aperture 1D, as well as to a telescope 1I and detector 1J. The various spacecraft and imager axes are also shown. FIG. 11D illustrates the coordinate frame of the imager 1J, and shows an image of the Earth overlaid on the imager.

Quaternion Controller

Central to the Y-Z Sun Acquisition mode is the controller that uses quaternions (also known in the art as Euler parameters) to track the attitude of the spacecraft 1. Quaternions are preferred because they have no geometric singularities for large angle reorientation/slew maneuvers that can be encountered. The digital integrating gyros (DIRAs) are used as the only sensors to provide incremental angle changes to the quaternion integration algorithm. Control torques are provided by the pulse-width pulse-frequency (PWPF) modulated thrusters.

Figure 3:
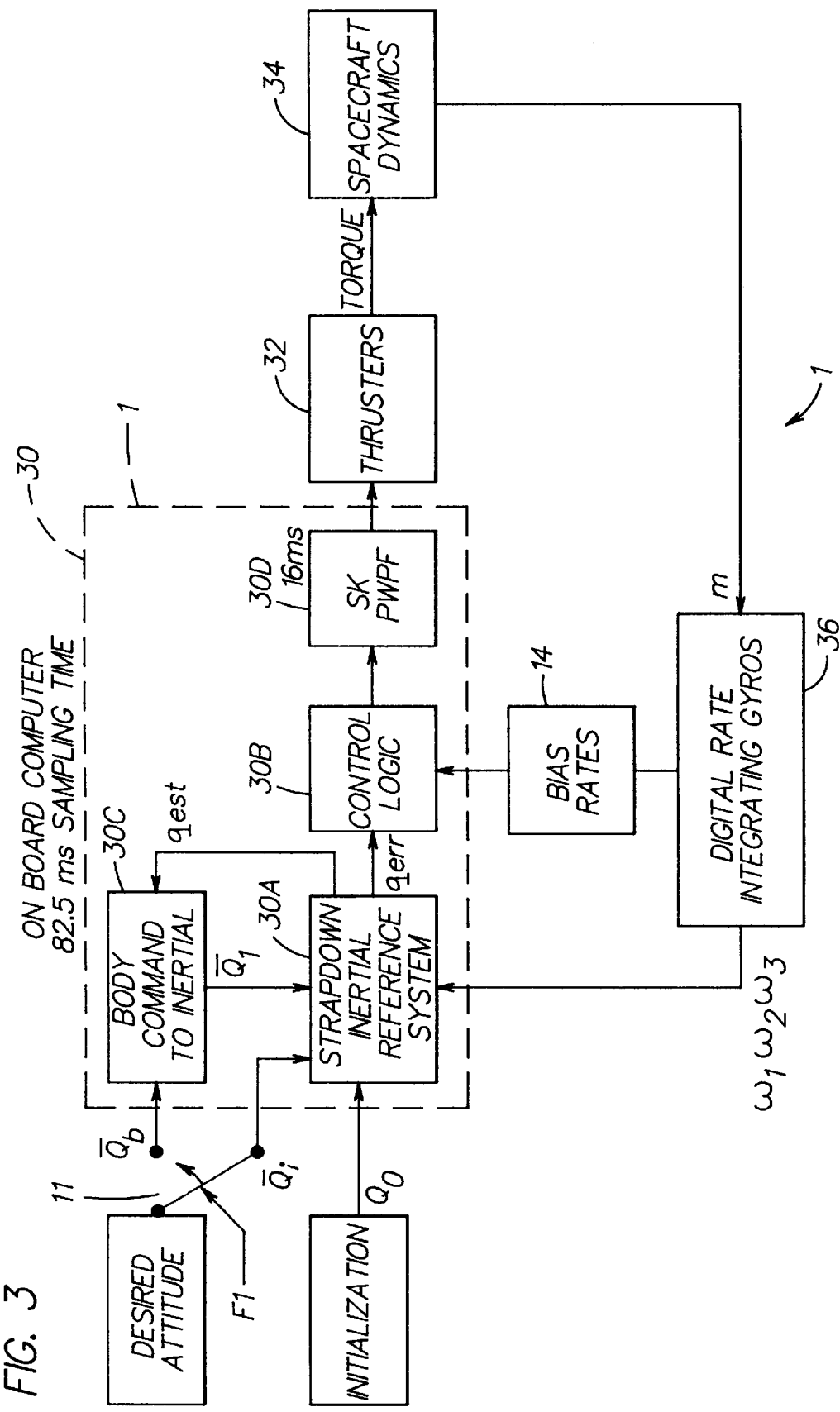
FIG. 3 is a block diagram of a spacecraft that includes a quaternion controller in accordance with the teaching of this invention.

A block diagram for the spacecraft 1 having the quaternion controller in accordance with this invention is shown in FIG. 3. Upon receipt of a desired attitude quaternion from either a ground command or from sequence logic resident in an on-board processor 30 that includes a quaternion controller, embodied partially in the strapdown inertial reference system 30A, the system computes an error quaternion ($q_{err}$) representing the difference between the desired attitude and the currently estimated attitude. The quaternion control logic 30B then computes and continuously updates closed loop torques to drive this error to zero, along with any non-zero body rates, using the PWPF modulated reaction jet thrusters 32.

The commanded quaternion can be specified with respect to either the spacecraft's inertial or body frame by the state of a flag ($F_1$) that controls a logical switch 11. When the commanded quaternion is specified with respect to the spacecraft's body frame, the commanded quaternion is sent to a body command to inertial block 30C which converts the body referenced command to an inertially referenced command, based on the current spacecraft attitude quaternion estimate $q_{est}$ obtained from block 30A, as described below. It should be noted that the quaternion estimate will nominally be referenced to the inertial frame, although this is not required. The use of body referenced commands, along with re-initialization of the quaternion estimate, can be used if it is desired to represent the quaternions in the body frame. However, body referenced commanding in many cases results in the loss of the inertial reference and generally is less desirable.

Figure 4:
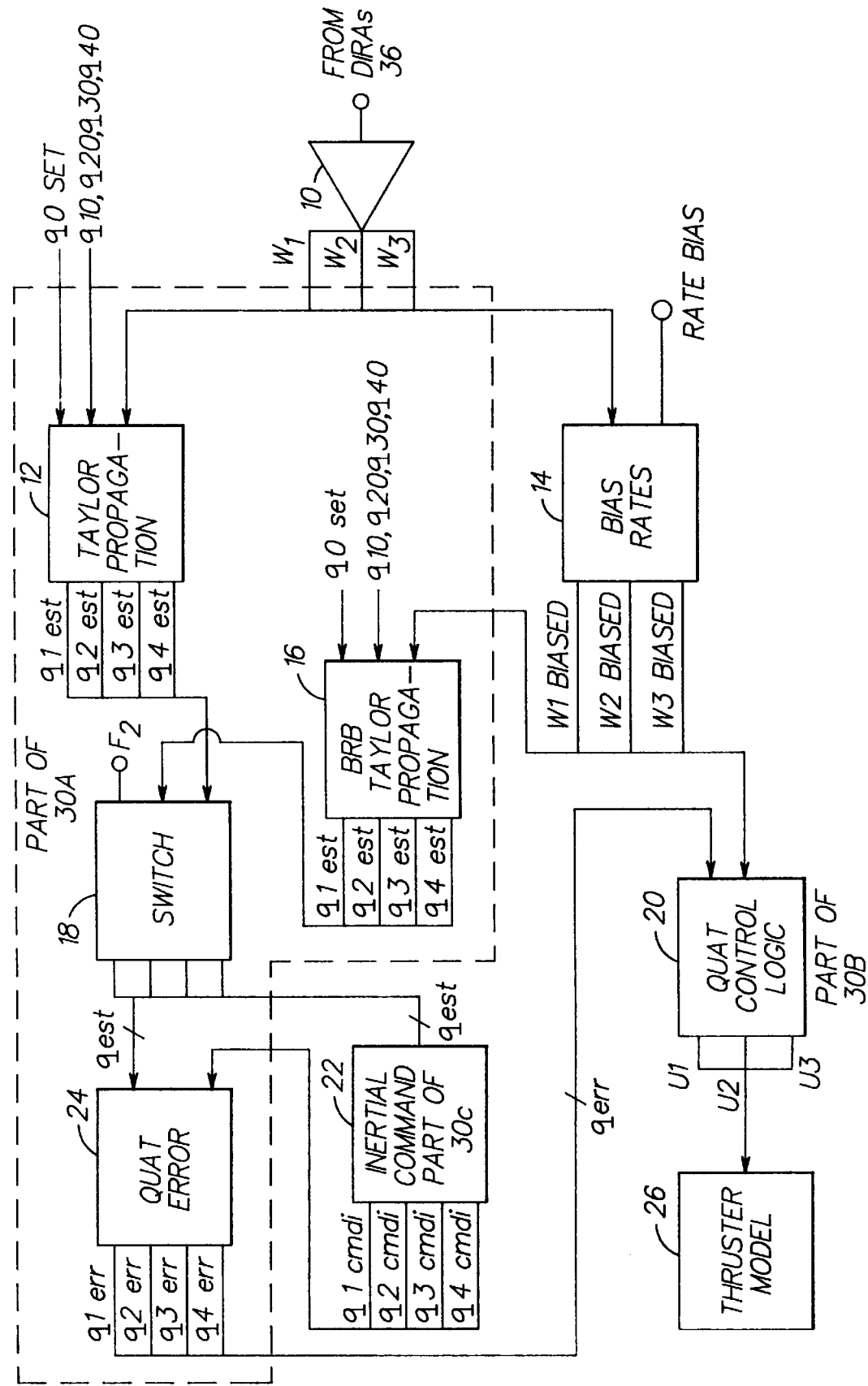
FIG. 4 is a block diagram that illustrate the quaternion controller in greater detail.
Figure 5A:
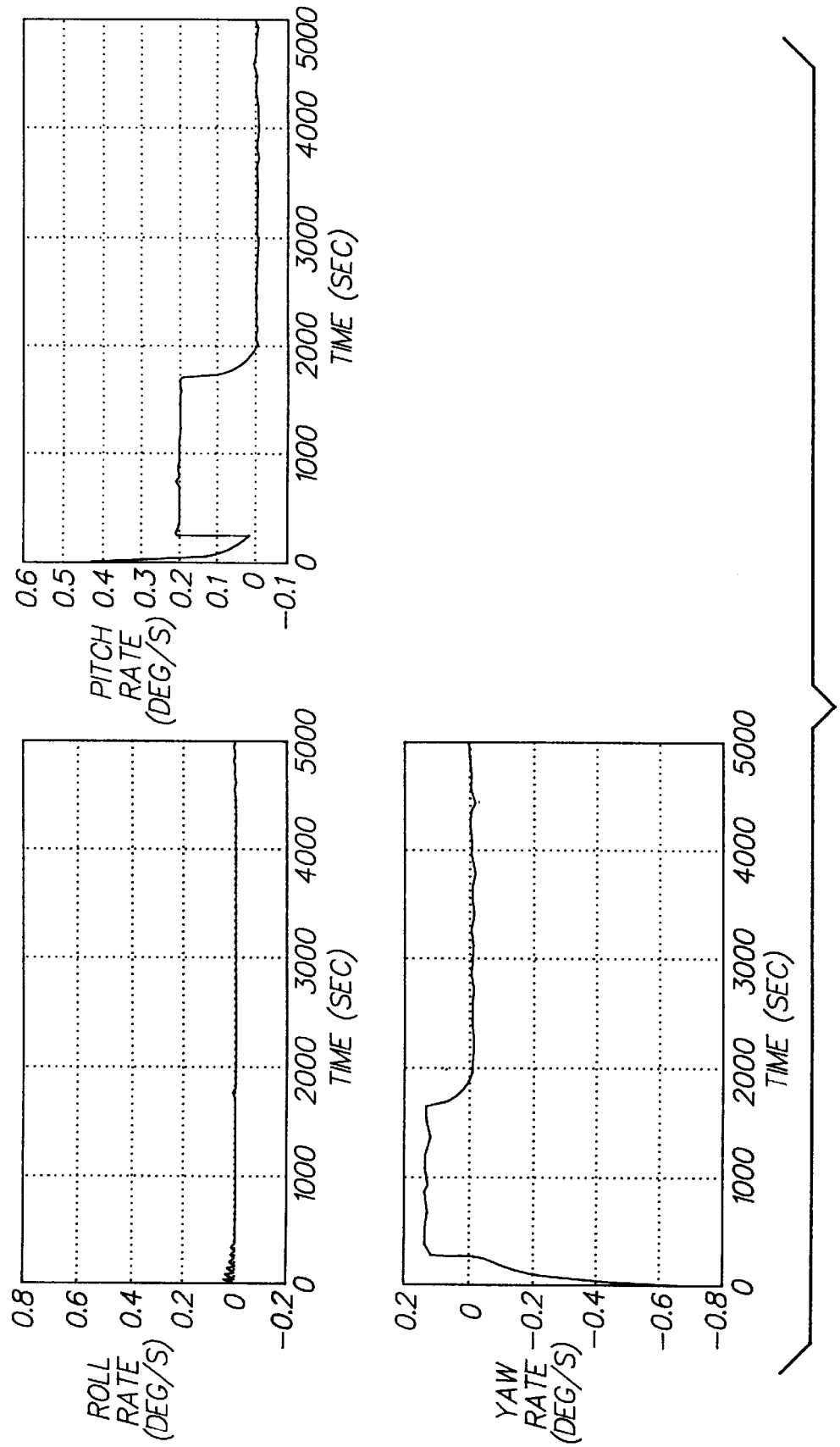
FIGS. 5A, 5B, 6A, 6B, 7A, 7B, 8, 9 and 10 are graphs illustrating a typical Y–Z Sun Acquisition sequence using the quaternion controller in accordance with this invention.
Figure 5B:
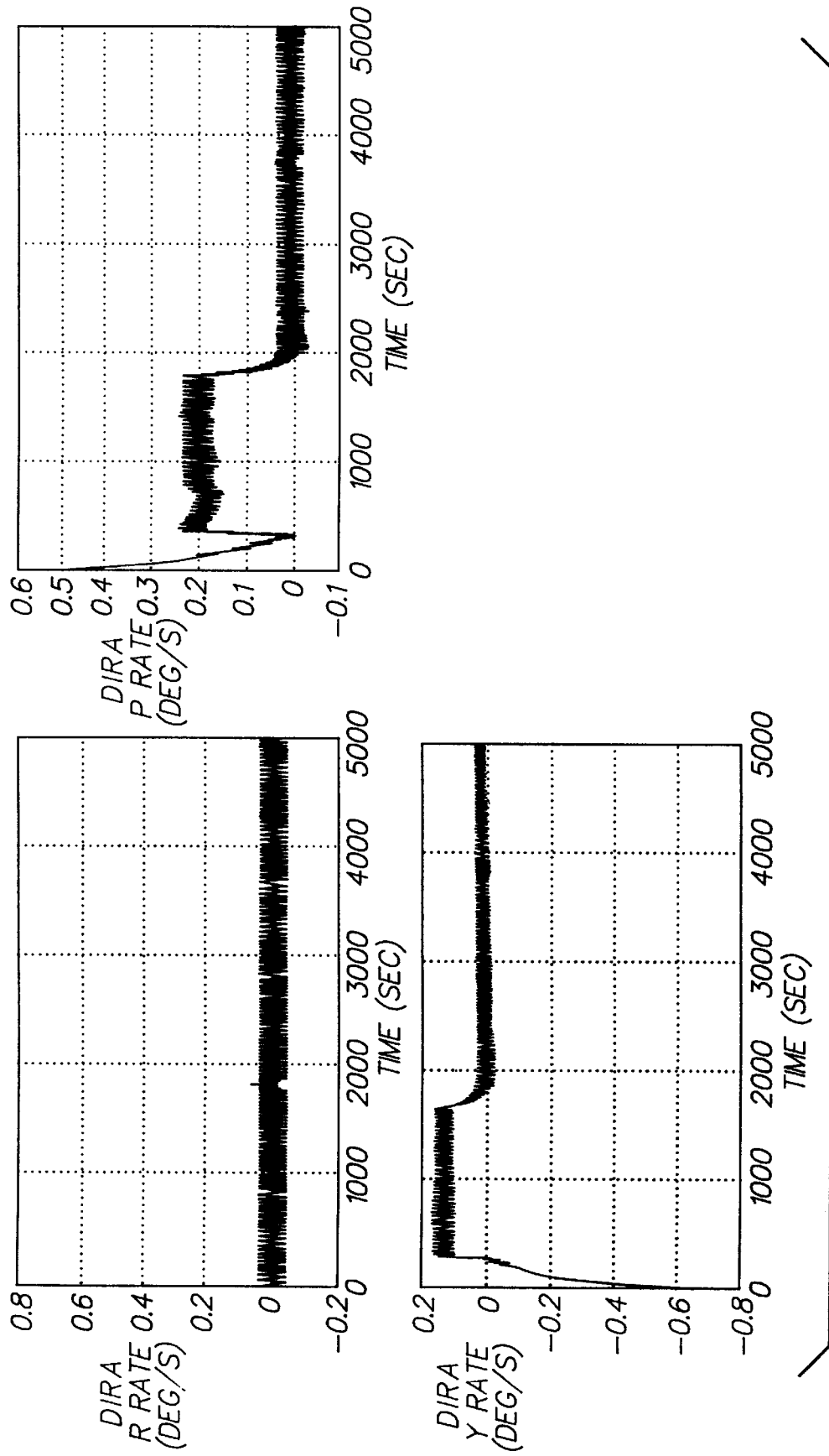
Figure 6A:
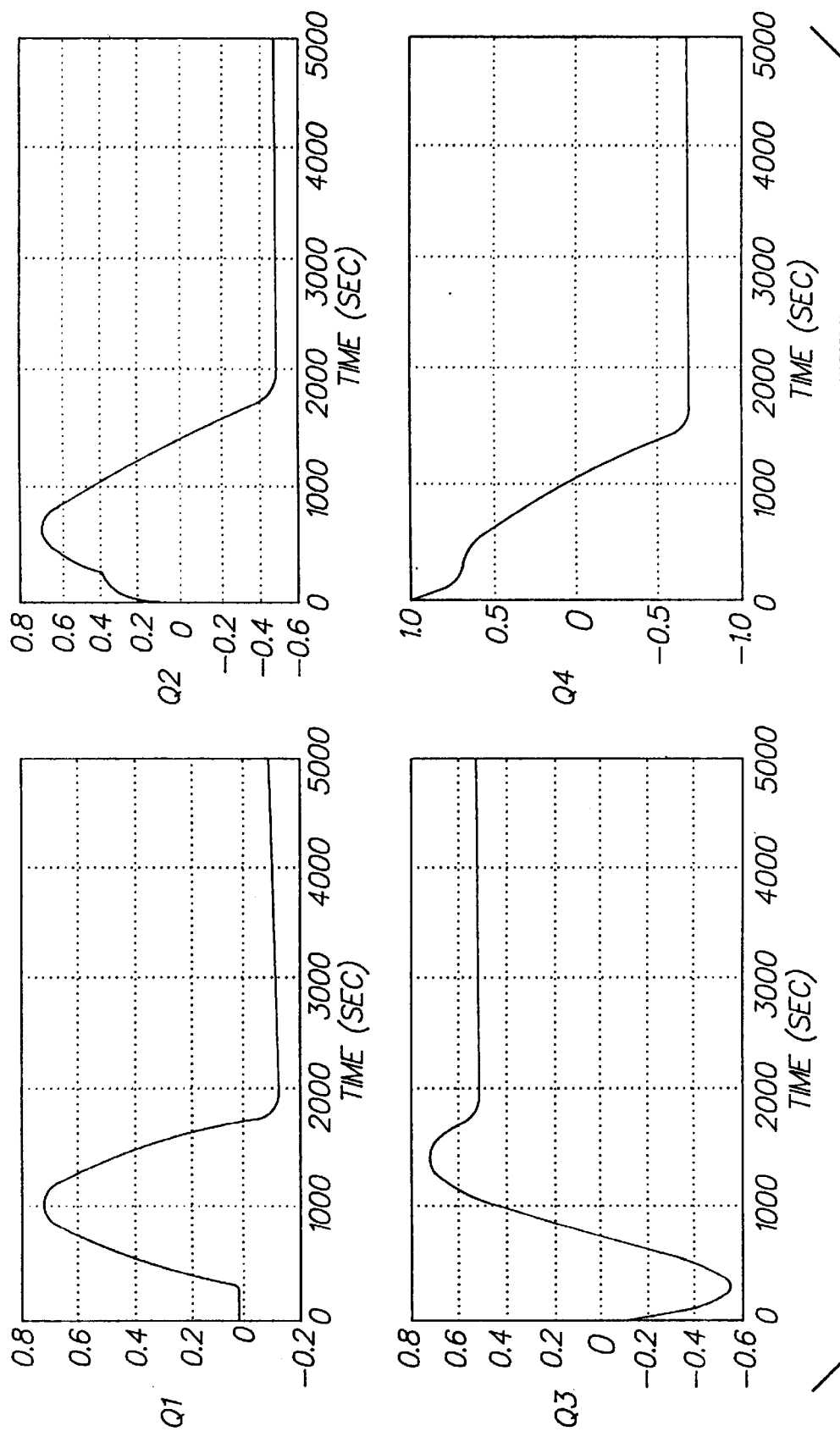
Figure 6B:
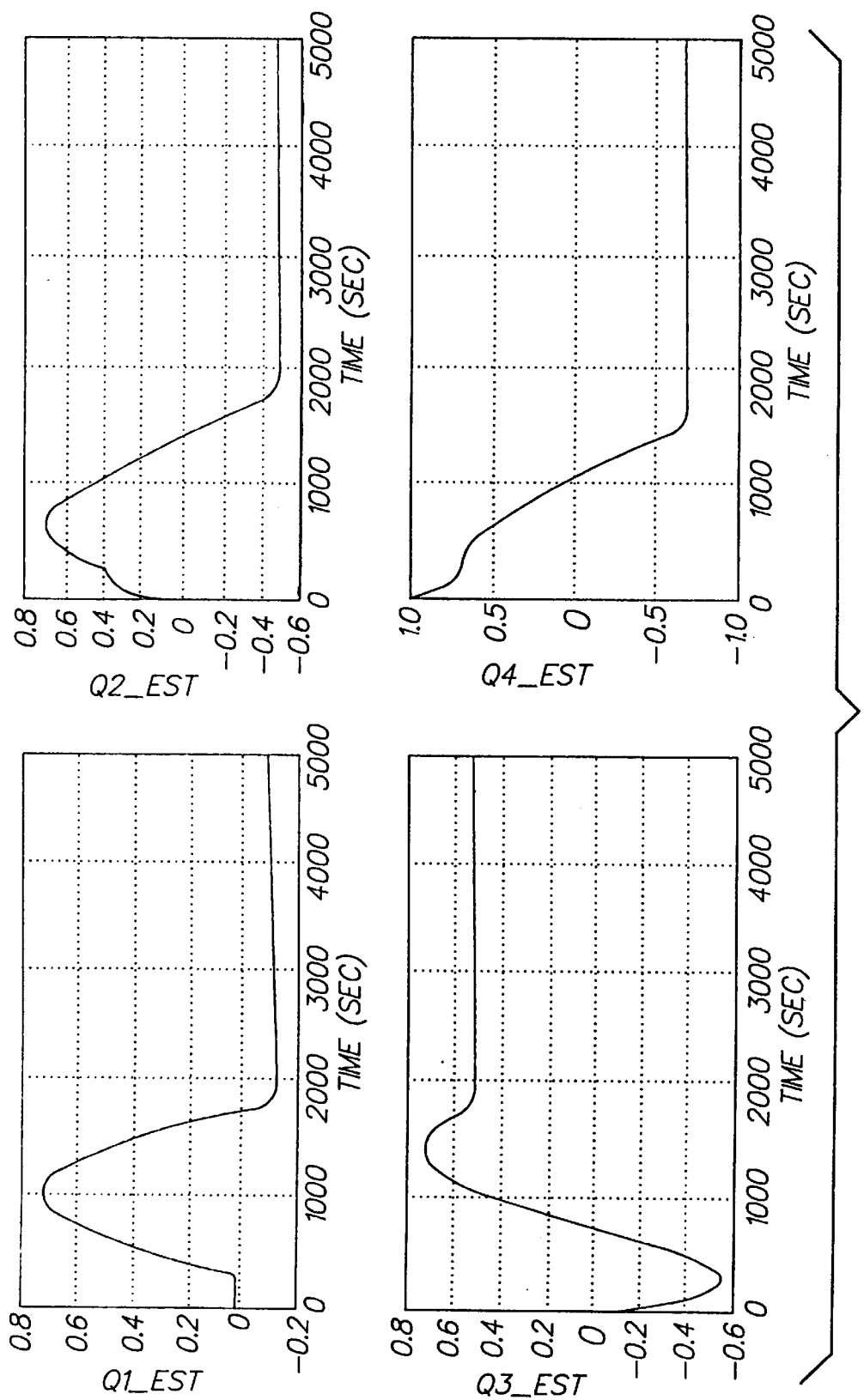
Figure 7A:
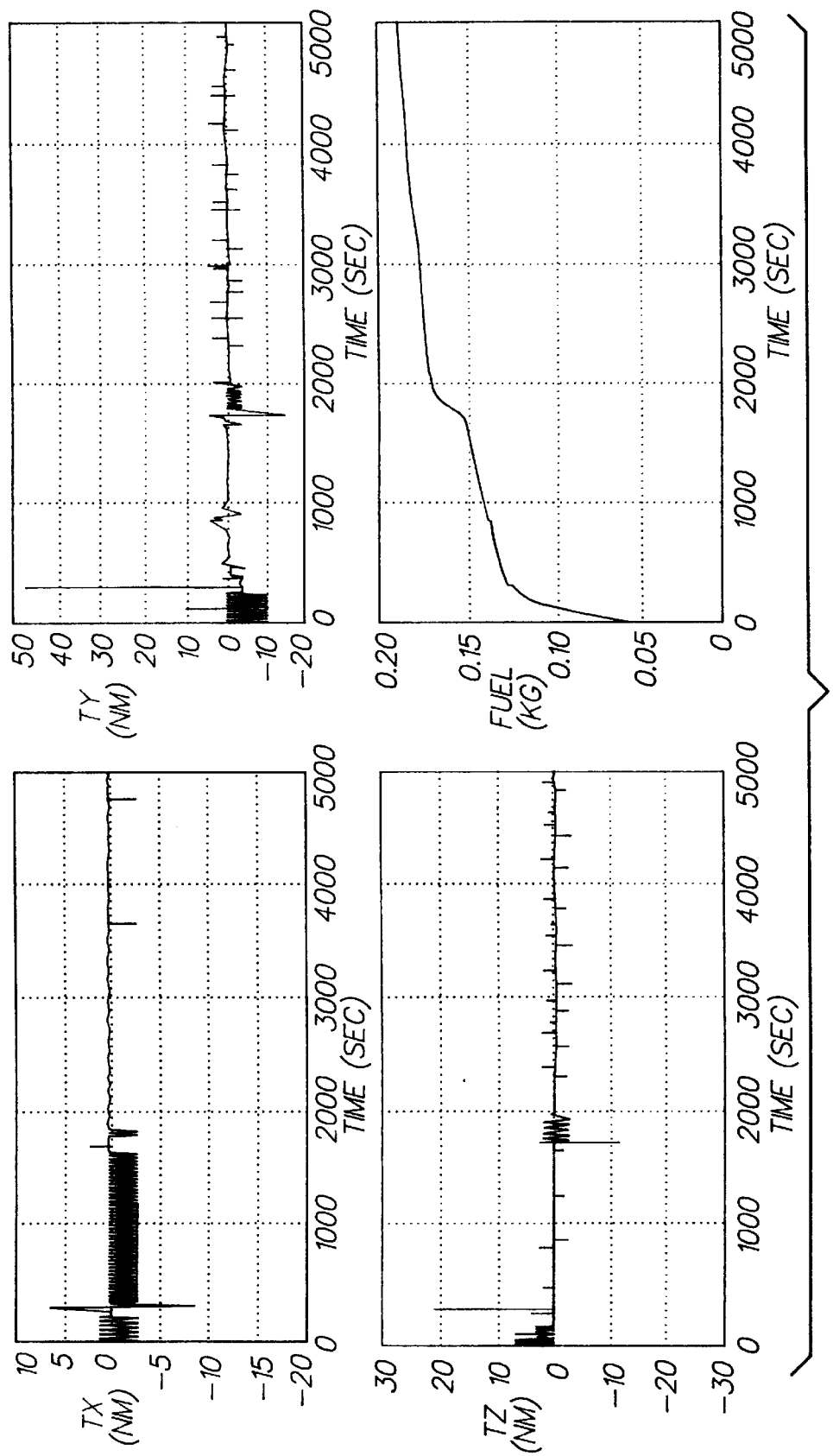
Figure 7B:
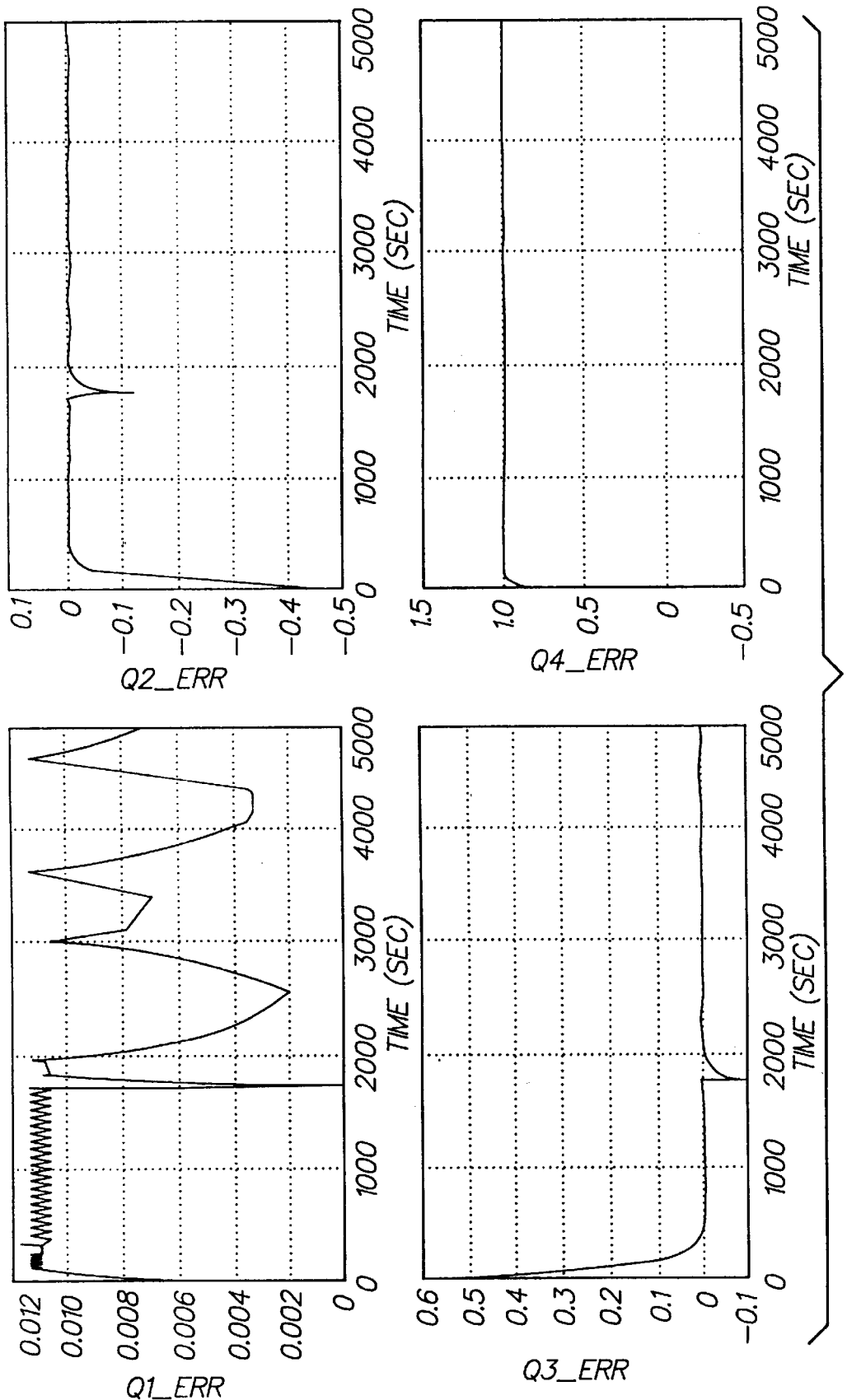
Figure 8:
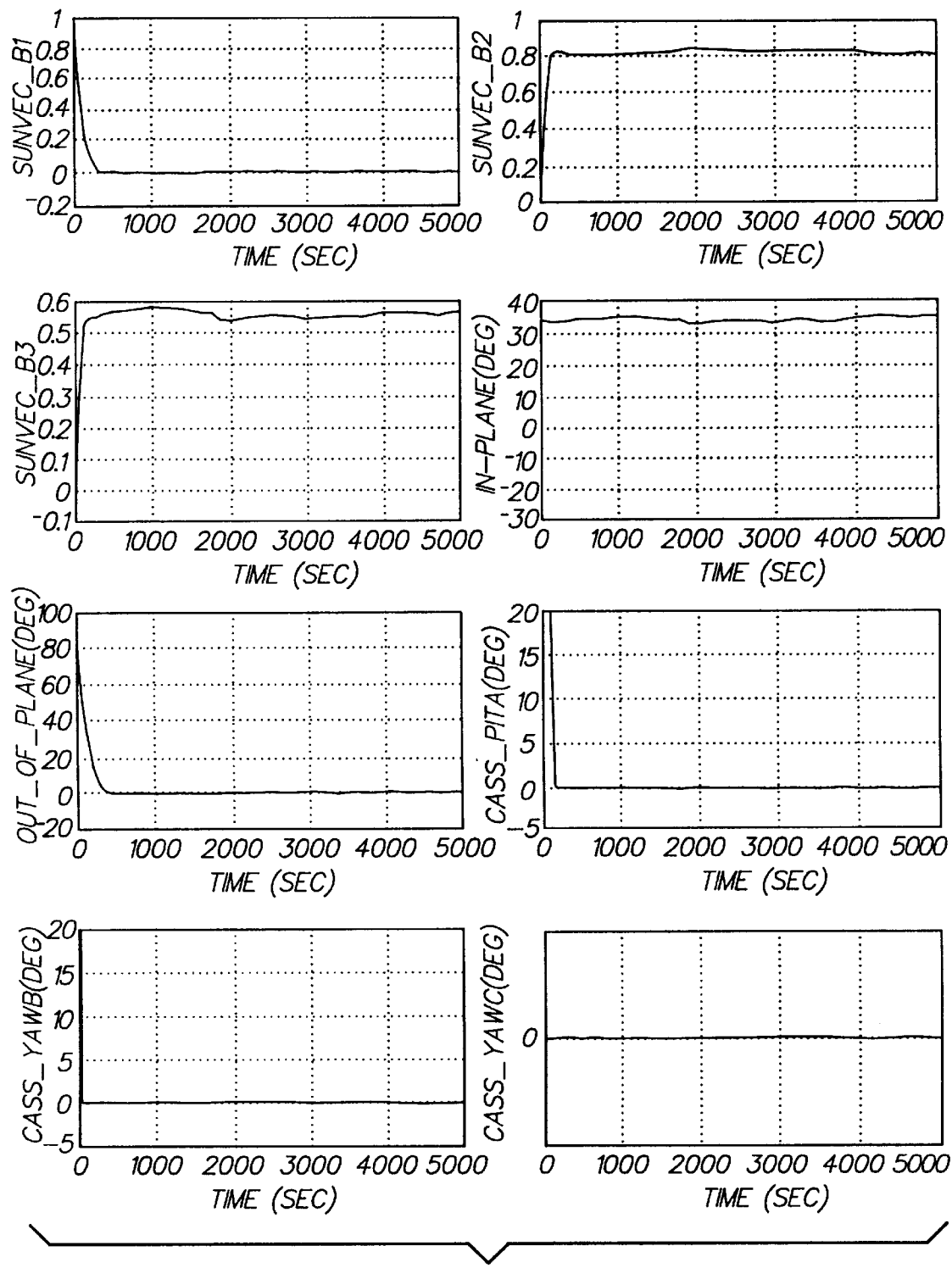
Figure 9:
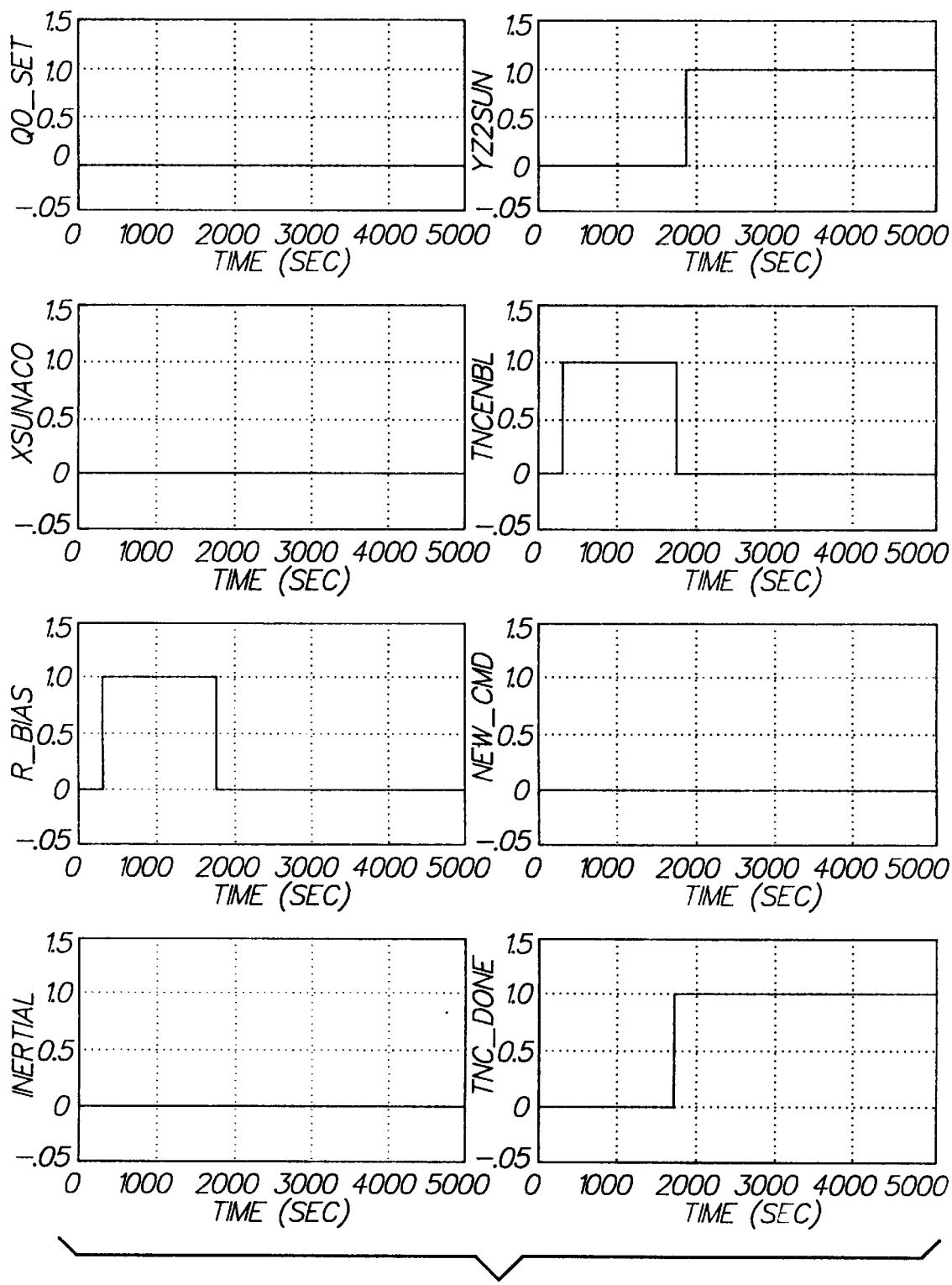
Figure 10:
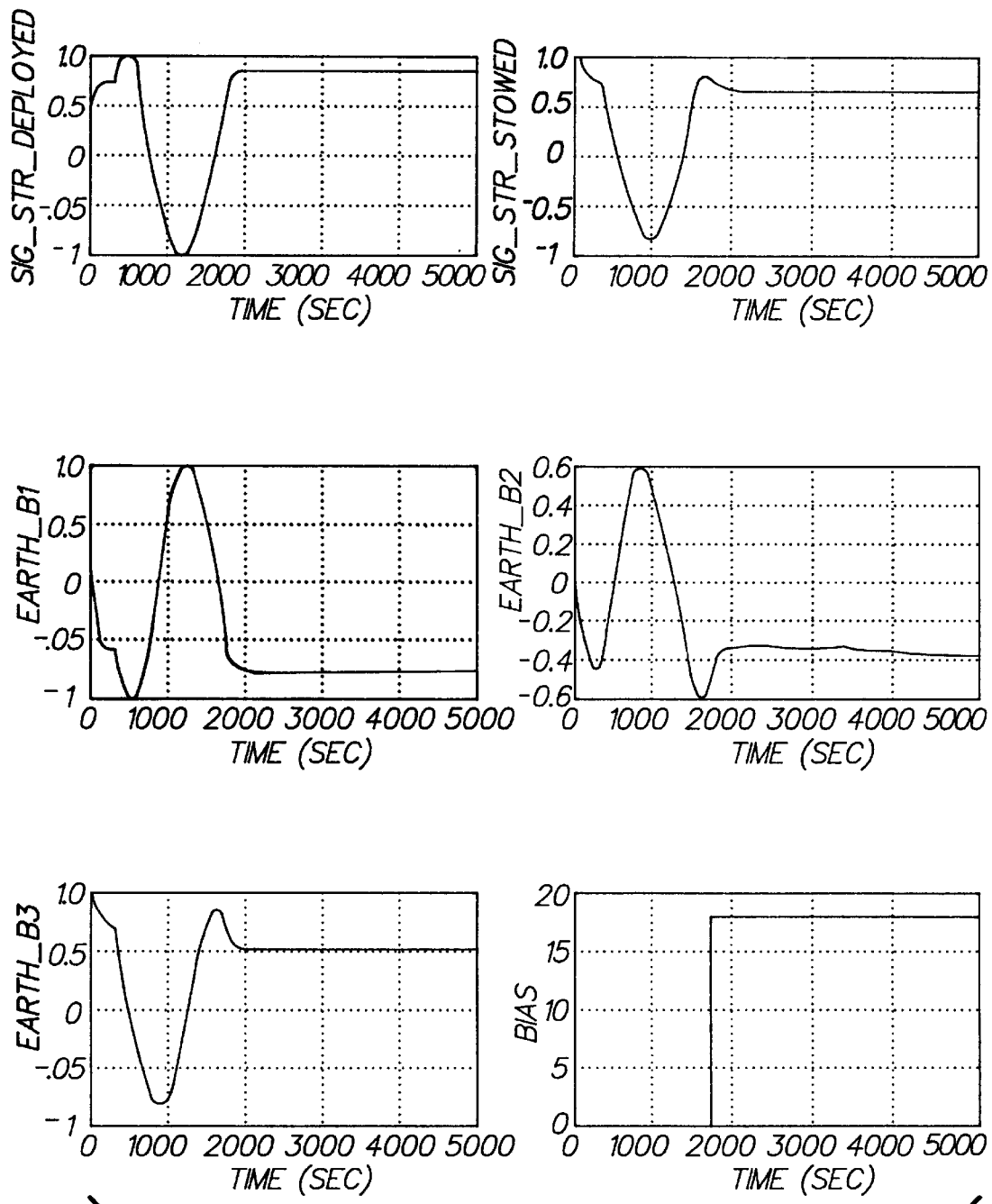

The following pseudocode describes the presently preferred algorithm executed by the body command to inertial block 30C of FIG. 3 (see also the inertial command block 22 of FIG. 4, which forms a part of the block 30C).

```
inputs: (q1_est,q2_est,q3_est,q4_est);
inputs: (new_cmd,inertial,q1_cmd,q2_cmd,q3_cmd,q4_cmd);
states: (cmd_1,cmd_2,cmd_3,cmd_4);
next_states: (cmd_1n,cmd_2n,cmd_3n,cmd_4n);
outputs: (q1_cmdi,q2_cmdi,q3_cmdi,q4_cmdi);
f        l        o        a        t
q1_est,q2_est,q3_est,q4_est,q1_cmd,q2_cmd,q3_cmd,q4_cmd;
float
cmd_1,cmd_2,cmd_3,cmd_4,cmd_1n,cmd_2n,cmd_3n,cmd_4n;
logical   new_cmd,inertial;
cmd_1n = cmd_1;
cmd_2n = cmd_2;
cmd_3n = cmd_3;
cmd_4n = cmd_4;
if (new_cmd) then
    if (inertial) then # inertial command was sent
        cmd_1n = q1_cmd;
        cmd_2n = q2_cmd;
        cmd_3n = q3_cmd;
        cmd_4n = q4_cmd;
    else # convert body referenced command sent to
            inertial
        cmd_1n = q4_est*q1_cmd - q3_est*q2_cmd +
                q2_est*q3_cmd + q1_est*q4_cmd;
        cmd_2n = q3_est*q1_cmd + q4_est*q2_cmd -
                q1_est*q3_cmd + q2_est*q4_cmd;
        cmd_3n = -q2_est*q1_cmd + q1_est*q2_cmd +
                q4_est*q3_cmd +q3_est*q4_cmd;
        cmd_4n = -q1_est*q1_cmd - q2_est*q2_cmd -
                q3_est*q3_cmd + q4_est*q4_cmd;
    endif;
    if ((q4_est < 0.0 & cmd_4n > 0.0) | (q4_est > 0.0 &
        cmd_4n <0.0)) then
        cmd_1n = -cmd_1n;
        cmd_2n = -cmd_2n;
        cmd_3n = -cmd_3n;
        cmd_4n = -cmd_4n;
    endif;
endif;
q1_cmdi = cmd_1n;
q2_cmdi = cmd_2n;
q3_cmdi = cmd_3n;
q4_cmdi = cmd_4n;
```

The thrusters 32 produce a torque which interacts with the spacecraft dynamics, depicted as the block 34, which is then sensed by the DIRAs 36. The output of the DIRAs 36 is provided to the strapdown inertial reference system block 30A and also to the control logic block 30B via bias rates block 14. The rates are either biased or not, depending on the mode of operation. If not biased, the rates simply pass through the bias rates block 14. The strapdown inertial reference system block 30A also receives an output (representing a converted body-to-inertial commanded quaternion ($q_{cmd}$)) from the body command to inertial block 30C, and provides an input to same for indicating the spacecraft's current estimated attitude ($q_{est}$). The control logic block 30B requests control torques from a stationkeeping (SK) PWPF control block 30D which operates the PWPF thrusters 32, thereby closing the loop.

A description of the bias-rate blind quaternion is further made now with reference to FIG. 4, which depicts in greater detail portions of the quaternion controller block 30 and related components of FIG. 3. The quaternion controller 30 and related components include an input port 10 which receives angular rate inputs ($\omega 1$–$\omega 3$) from the DIRAs 36, a Taylor series propagation block 12 which estimates non-rate biased quaternions using a well-known Taylor series expansion, the bias rates block 14 (described below), a second Bias Rate Blind (BRB) Taylor series propagation block 16 (described below) which estimates rate biased quaternions also using the well-known Taylor expansion, a switch block 18, quaternion control logic 20 (embodied in block 30B of FIG. 3), inertial command block 22 (embodied in the block 30C of FIG. 3), quaternion error block 24, and a thruster model sub-system 26. Certain of the blocks execute bias-rate blind propagation equations (described below) and equations which introduce a bias to the rate signals provided by the DIRAs 36 (described in further detail below). Based on the value of a second Flag ($F_2$), the quaternion controller 30 switches from using normal quaternion propagation (output from Taylor propagation block 12) to using bias-rate blind quaternion propagation (output from BRB Taylor propagation block 16). The quaternion control logic block 20 receives quaternion errors to be nulled from the quaternion error block 24. These received errors contain only errors between the commanded and the current, estimated quaternion, exclusive of those errors specifically associated with the rotation about the desired axis. This allows the quaternion controller 20 to continue nulling cross-axis errors without attempting to null errors that are produced by the rotation.

The following describes in greater detail the presently preferred algorithm executed by the BRB Taylor propagation quaternion block 16, and may be referred to as a Blind Quaternion Propagation Algorithm.

```
inputs: (ω1_biased, ω2_biased, ω3_biased, q0_set (a flag
    set when the quaternion is to be initialized), q10,
    q20, q30, q40 (the desired initial values for the
    quaternion));
outputs: (q1_est, q2_est, q3_est, q4_est);
parameters: (TS,D2R),
states: (q1, q2, q3, q4),
next_states: (q1n, q2n, q3n, q4n);
floatr1,r2,r3,r4,d_theta1,d_theta2,d_theta3,d_theta4,nrm;
logical q0_set;
q1n=q1;
q2n=q2;
q3n=q3;
q4n=q4;
if (q0_set) then
    q1n=q10;
    q2n=q20;
    q3n=q30;
    q4n=q40;
endif;
d_theta1 = ω1_biased*TS;
```

-continued

```
d_theta2 = ω2_biased*TS;
d_theta3 = ω3_biased*TS;
\** vector form **\
d = sqrt (d_theta1^2 + d_theta2^2 + d_theta3^2);
r1 = 0.5* (d_theta1*q4 − d_theta2*q3 + d_theta3*q2);
r2 = 0.5* (d_theta1*q3 + d_theta2*q4 − d_theta3*q1);
r3 = 0.5* (−d_theta1*q2 + d_theta2*q1 + d_theta3*q4);
r4 = 0.5* (−d_theta1*q1 − d_theta2*q2 − d_theta3*q3);
q1n = q1n + r1 − d^2*q1n − d^2*r1/3 + d^4*q1n/6;
q2n = q2n + r2 − d^2*q2n − d^2*r2/3 + d^4*q2n/6;
q3n = q3n + r3 − d^2*q3n − d^2*r3/3 + d^4*q3n/6;
q4n = q4n + r4 − d^2*q4n − d^2*r4/3 + d^4*q4n/6;
nrm = sqrt(q1n^2 + q2n^2 + q3n^2 + q4n^2);
q1n=q1n/nrm;
q2n=q2n/nrm;
q3n=q3n/nrm;
q4n=q4n/nrm;
q1_est=q1n;
q2_est=q2n;
q3_est=q3n;
q4_est=q4n;
```

Setting Rate Biases

The quaternion control law serves two basic purposes: to null the spacecraft angular rates about all three body axes, and to reorient the spacecraft to a desired attitude represented by the command quaternion. However, as was mentioned above an additional feature has been incorporated in the quaternion controller 30 to command and maintain a non-zero rotation rate about a selected axis. This feature beneficially provides the above-mentioned T&C signal strength mapping capability. As was described above, to map the T&C signal strength it is desired to hold the current spacecraft attitude such that the sunline is 35° off the Y-axis, and to rotate at a constant rate about the sunline. Because the quaternion controller 30B operates to remove the error between the commanded and the currently estimated quaternion, the need arises to provide for a "rate-bias blind" quaternion. This allows the user to hold the current attitude and null any deviation between the commanded and the current quaternion, other than those quaternion errors specifically resulting from initiating a non-zero rotation rate about a desired axis (e.g., the sunline). This feature can be selected from a ground command or from command logic in the on-board processor 30 by specifying the desired rotation rate and body axis components of the rotation axis unit vector to the quaternion controller 30.

The following describes in greater detail the presently preferred algorithm executed by the bias rates block 14, and may be referred to as the Biased Rate Equations.

```
inputs: (ω1, ω2, ω3, r_bias);
outputs: (ω1_biased, ω2_biased, ω3_biased);
parameters: (ω_search, n_rot, degrees to radians (D2R));
float ω1, ω2, ω3, ω1_biased, ω2_biased, ω3_biased,
    n_rot (3);
logical r_bias;
if (r_bias) then       \** w_search about vector n_rot **\
    ω1_biased = ω1-ω_search*D2R*n_rot(1);
    ω2_biased = ω2-ω_search*D2R*n_rot(2);
    ω3_biased = ω3-ω_search*D2R*n_rot(3);
else
    ω1_biased=ω1;
    ω2_biased=ω2;
    ω3_biased=ω3;
endif;
```

If rate biasing is not being used, then the bias rates block 14 essentially passes the DIRA rates through (unbiased) to the control logic block 20.

Simulation

A simulation was performed for the above-described Y–Z Sun Acquisition procedure. The simulation included a model of the spacecraft dynamics 34 that maintains a record of the true spacecraft attitude by integrating Euler's equations and the actual quaternion with a variable step Kutta-Merson integration routine. A model of the DIRA 36 provided incremental angle changes to the quaternion controller 30. A switching logic block contains logic for sequencing the quaternion controller 30 through the various phases of Y–Z Sun Acquisition procedure. These phases included those: (1) to null the rates about the sunline, (2) to slew to 35° from the +Y axis, (3) to rotate at a constant rate about the sunline to map the T&C signal strength, and (4) to hold the spacecraft at the maximum coverage angle with the sunline 35° from the +Y-axis.

The main modelling features of the simulation included:

a. sensor delays, noise, quantization, and sampling;

b. thruster cross-axis torques (mixed strings were used for pre-deployment);

c. a microprocessor cycle time of 62.5 ms;

d. Kutta-Merson integration of the dynamics and true quaternion; and e. Fourth-order Taylor series expansion (block 12 of FIG. 4) for integrating the quaternion estimate.

Results from a typical Y–Z Sun Acquisition sequence are shown in FIGS. 5A, 5B, 6A, 6B, 7A, 7B, 8, 9 and 10.

First, a total of 55 pulses were fired during the first 4.5 seconds of the simulation to null the initial rate. Then, upon sensing that the rates were nulled, the logic generated and sent a quaternion command to slew the spacecraft to 35° from the +Y-axis. As the rates (FIGS. 5A and 5B), thruster time histories, and quaternion errors (FIGS. 7A and 7B) show, the quaternion control law, by way of the PWPF, produced a series of pulses to initiate rates about the Yaw and Pitch axes to slew the spacecraft to the desired attitude. These rotation rates were driven to zero as the spacecraft was brought to rest with the final quaternion error equal to zero at t=300 sec. A chart of the path of the sunline in the body frame is provided in FIG. 8, which shows the body [$b_1$, $b_2$, $b_3$] components of the sunline. The simulation begins with the sunline initially aligned with the +X-axis with [$b_1$, $b_2$, $b_3$]=[1,0,0]. At the end of the first slew at t=300 sec the body components have changed to the desired values of [0,cos(35),sin(35)], indicating that the sunline has moved to 35° from the +Y-axis in the Y–Z plane. These body referenced components of the sunline are used to construct the in-plane and out-of-plane projections of the sunline to the Y–Z plane shown in FIG. 8, which are used to define the pointing accuracy.

While the invention has been particularly shown and described with respect to preferred embodiments thereof, it will be understood by those skilled in the art that changes in form and details may be made therein without departing from the scope and spirit of the invention.

What is claimed is:

1. A spacecraft, comprising:

a sensor to provide a single initial two-axis fix along a specified vector, thereby providing initial two-axis attitude knowledge about the spacecraft;

a plurality of gyroscopes for sensing spacecraft body angular rates;

a plurality of thrusters for applying torques to said spacecraft body;

a quaternion controller for repetitively determining a difference between a commanded quaternion and a quaternion estimate based on the sensed angular rates; and thruster controller for selectively activating said thrusters to apply torques to the spacecraft body so as to drive the difference towards zero for aligning a spacecraft vector with an inertial direction, thereby orienting the spacecraft.

2. A spacecraft as in claim 1, wherein said quaternion controller maintains the spacecraft fixed in orientation.

3. A spacecraft as in claim 1, wherein said quaternion controller causes said spacecraft to rotate about the specified vector using a bias-rate blind quaternion propagation technique.

4. A spacecraft as in claim 1, wherein said quaternion controller causes said spacecraft to rotate about the specified vector at a predetermined angular rate, while maintaining the spacecraft's orientation, by biasing the sensed angular rates in accordance with the predetermined angular rate.

5. A spacecraft as in claim 1, wherein said thrusters are comprised of pulse width, pulse frequency thrusters.

6. A spacecraft as in claim 1, wherein said plurality of gyroscopes are comprised of digital rate integrating gyroscopes.

7. A spacecraft as in claim 1, wherein the specified vector is equal to the inertial direction.

8. A spacecraft as in claim 1, wherein the specified vector lies along a line between the spacecraft and the sun.

9. A method for reorienting a spacecraft, comprising the steps of:

determining a desired attitude of the spacecraft and operating a sensor to obtain a single two-axis inertial reference;

determining an offset amount between the desired attitude of the spacecraft and a currently estimated attitude of the spacecraft; and repetitively computing and applying closed loop torques so as to drive the offset amount towards zero, in conjunction with any non-zero spacecraft body rates, so as to reorient the spacecraft relative to the single two-axis inertial reference.

10. A method as in claim 9, wherein the satellite comprises an imager for obtaining an image of the Earth.

11. A method as in claim 9, further comprising the step of:

rotating the spacecraft at said non-zero spacecraft body rate; and mapping signal strength from said spacecraft as said spacecraft rotates.

12. A method as in claim 11, wherein said rotating of said spacecraft is about a sunline.

13. A method as in claim 12, further comprising rotating the spacecraft to an angle at which best signal strength is found, during mapping.

14. A spacecraft, comprising:

a sensor to provide an initial two-axis fix along a specified vector, thereby providing initial two-axis attitude knowledge about the spacecraft;

a plurality of gyroscopes for sensing spacecraft body angular rates;

a plurality of thrusters for applying torques to said spacecraft body;

a quaternion controller for repetitively determining a difference between a commanded quaternion and a quaternion estimate based on the sensed angular rates; and a thruster controller for selectively activating said thrusters to apply torques to the spacecraft body so as to drive the difference towards zero for aligning a spacecraft vector with an inertial direction, thereby orienting the spacecraft;

wherein said quaternion controller causes said spacecraft to rotate about the specified vector using a bias-rate blind quaternion propagation technique.

15. A spacecraft, comprising:

a sensor to provide an initial two-axis fix along a specified vector, thereby providing initial two-axis attitude knowledge about the spacecraft;

a plurality of gyroscopes for sensing spacecraft body angular rates;

a plurality of thrusters for applying torques to said spacecraft body;

a quaternion controller for repetitively determining a difference between a commanded quaternion and a quaternion estimate based on the sensed angular rates; and a thruster controller for selectively activating said thrusters to apply torques to the spacecraft body so as to drive the difference towards zero for aligning a spacecraft vector with an inertial direction, thereby orienting the spacecraft;

wherein said quaternion controller causes said spacecraft to rotate about the specified vector at a predetermined angular rate, while maintaining the spacecraft's orientation, by biasing the sensed angular rates in accordance with the predetermined angular rate.

* * * * *